US009598867B1

(12) United States Patent
Conklin

(10) Patent No.: US 9,598,867 B1
(45) Date of Patent: Mar. 21, 2017

(54) WALKABLE SKYLIGHT LIGHTING SYSTEM

(71) Applicant: Wayne Conklin, Butler, NJ (US)

(72) Inventor: Wayne Conklin, Butler, NJ (US)

( * ) Notice: Subject to any disclaimer, the term of this patent is extended or adjusted under 35 U.S.C. 154(b) by 70 days.

(21) Appl. No.: 14/840,557

(22) Filed: Aug. 31, 2015

(51) Int. Cl.
| | | |
|---|---|---|
| E04F 19/00 | (2006.01) |
| E04H 14/00 | (2006.01) |
| E04D 13/03 | (2006.01) |
| E04B 7/18 | (2006.01) |
| F21S 4/00 | (2016.01) |
| F21S 19/00 | (2006.01) |
| F21S 8/00 | (2006.01) |
| F21S 8/04 | (2006.01) |
| F21V 5/04 | (2006.01) |
| F21Y 103/00 | (2016.01) |
| F21W 131/40 | (2006.01) |
| E04D 13/00 | (2006.01) |
| E04D 13/035 | (2006.01) |
| F24J 2/06 | (2006.01) |
| E04D 13/12 | (2006.01) |

(52) U.S. Cl.
CPC ............ E04D 13/0315 (2013.01); E04B 7/18 (2013.01); F21S 4/008 (2013.01); F21S 8/032 (2013.01); F21S 8/04 (2013.01); F21S 19/005 (2013.01); F21V 5/048 (2013.01); E04D 13/00 (2013.01); E04D 13/0305 (2013.01); E04D 13/035 (2013.01); E04D 13/12 (2013.01); F21W 2131/40 (2013.01); F21Y 2103/003 (2013.01); F24J 2/06 (2013.01); F24J 2/067 (2013.01); Y02B 20/36 (2013.01)

(58) Field of Classification Search
CPC ..... E04D 13/0315; E04D 13/12; E04D 13/00; E04D 13/035; E04D 13/0335; E04D 13/0305; E04B 7/18; F24J 2/067; F24J 2/06; Y02B 20/36
USPC .................................. 52/28, 200, 263, 173.1
See application file for complete search history.

(56) References Cited

U.S. PATENT DOCUMENTS

| 2,193,393 A | 3/1940 | Danner |
| 2,618,819 A | 11/1952 | Goodwillie |
| 4,074,480 A | 2/1978 | Burton |
| 4,222,213 A | 9/1980 | Kessler |
| 4,294,649 A | 10/1981 | Sarka |
| 4,431,691 A | 2/1984 | Greenlee |

(Continued)

FOREIGN PATENT DOCUMENTS

| AU | B4022989 | 3/1990 |
| AU | B5464990 | 11/1990 |
| CA | 2015714 | 11/1990 |
| CA | 1328970 | 5/1994 |
| EP | 0356374 | 2/1990 |
| EP | 0396075 | 11/1990 |
| GR | 3017183 | 11/1995 |
| IE | 62450 | 2/1995 |
| IE | 67796 | 5/1996 |
| MX | 165468 | 11/1992 |
| MX | 172717 | 1/1994 |
| NZ | 230417 | 3/1993 |
| WO | WO2004042164 | 5/2004 |
| WO | WO2005019561 | 3/2005 |
| WO | WO2007011561 | 1/2007 |
| WO | WO2009056186 | 5/2009 |
| WO | WO2012041325 | 4/2012 |
| WO | WO2014066385 | 5/2014 |

Primary Examiner — Chi Q Nguyen
(74) Attorney, Agent, or Firm — Goldstein Law Offices, P.C.

(57) ABSTRACT

A walkable skylight lighting system, installed to a roofing structure, including a skylight having a pane and framing members that surround and support the pane, and including a paving surface, the paving surface having a plurality of pavers that extend immediately adjacent to the skylight. The pane is an insulating glass unit (IGU) having structural glass panels and a thermal panel that are separated and sealed by a spacer, and separately supported so that they do not crush the spacer. The framing members include an upper framing member that has a lighting channel containing an LED lighting strip that edge lights the structural glass panels in the pane.

19 Claims, 6 Drawing Sheets

(56) References Cited

U.S. PATENT DOCUMENTS

| | | |
|---|---|---|
| 4,479,988 A | 10/1984 | Dawson |
| 4,520,602 A | 6/1985 | Miller |
| 4,994,309 A | 2/1991 | Reichert et al. |
| 4,999,964 A | 3/1991 | Taylor |
| 5,003,744 A | 4/1991 | Taylor |
| 5,042,210 A | 8/1991 | Taylor |
| 5,087,489 A | 2/1992 | Lingemann |
| 5,088,258 A | 2/1992 | Schield et al. |
| 5,207,036 A | 5/1993 | Sampson et al. |
| 5,218,806 A | 6/1993 | Taylor |
| 5,424,111 A | 6/1995 | Farbstein |
| 8,225,561 B2 | 7/2012 | Voegele, Jr. et al. |
| 8,291,674 B2 | 10/2012 | Valentz et al. |
| 8,381,490 B2 | 2/2013 | Back et al. |
| 8,397,468 B2 | 3/2013 | McClure |
| 8,701,362 B2 | 4/2014 | Stone |
| 9,441,378 B1 * | 9/2016 | Conklin .............. E04D 13/0315 |
| 2006/0272232 A1 | 12/2006 | Fooks |
| 2009/0110866 A1 | 4/2009 | Ainz et al. |
| 2014/0109499 A1 | 4/2014 | Nieminen et al. |
| 2014/0130426 A1 * | 5/2014 | Hartman ................. E04C 2/525 52/98 |

\* cited by examiner

WALKABLE SKYLIGHT LIGHTING SYSTEM

TECHNICAL FIELD

The present disclosure relates generally to a walkable skylight lighting system. More particularly, the present disclosure a lighting system for providing edge lit glass panels in a walkable skylight installation.

BACKGROUND

Modern trends in building design often desire making rooftop surfaces into useable and even public spaces. Since skylights are often already specified for an intended building design, once the roof becomes a walkway, the skylight must be made "walkable". Making a walkable skylight means designing them to support the additional loading potential of numerous people walking and standing upon them. At a minimum, making a skylight walkable means that several layers of thick glass will be used.

Edge lighting of glass or acrylic panels has become a popular way to accent interior space designs in modern structures. Edge lighting uses the principle of internal reflection to turn a translucent or transparent panel into a diffuse light source. Standard window framing configurations, however, make no provision for utilizing edge lighting in structural windows and skylights.

Traditionally skylights provide illumination from sunlight through standard roofing structures and are only designed to support their own weight and expected additional loading from snow. Generally they were not intended, and thus not designed, to support the weight of one or more persons walking upon them.

Further complicating the design of a walkable skylight, over the past several decades, nearly all new windows in residential and commercial buildings have more than one pane of glass and some type of thermally insulative structure or insulating glass unit (IGU). Typically they involve panes of glass separated by a thermal break spacer and sometimes involve evacuating the space in between or filling it with a noble gas such as argon or krypton. As these structures are typically not load-bearing, the materials used to fabricate such structures are generally lightweight and can be produced off-site in a manufacturing facility. In particular, the spacer typically employed consists of a tubular structure, made of thin metal, and often containing a desiccant material for absorbing moisture present in the air between the glass panels.

Unfortunately, multiple panels of thick heavy glass, and the weight of people walking thereupon, can be too much for the flimsy spacers currently available. It is inevitable that they will ultimately fail. Thus, because of the limitations in the glass spacers currently available, while architects desire the aesthetics and functionality of walkable skylight units, such aspirations must compete with the goal of creating an energy efficient building.

In addition, providing walkable surfaces on a rooftop must also consider other rooftop design constraints, such as providing adequate drainage. Accordingly, good drainage usually indicates providing sloped surfaces. Walking surfaces, on the other hand, should be flat.

Pedestal pavers provide an option by allowing an underlying roof surface to be flat, while paving stones (or "pavers") provide a flat walking surface. This is accomplished by a network of pedestals that each support a paving stone. The pedestals are individually adjustable in height to accommodate a sloping roof surface while keeping the paving stones level with each other.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a lighting system in conjunction with a walkable skylight that provides diffuse lighting from the skylight. Accordingly, the panes of the skylight are edge lit with an LED light strip that can be controlled to provide lighting of varying color and intensity.

It is another aspect of an example embodiment in the present disclosure to provide a system that may simultaneously illuminate several panels of glass within the pane. Accordingly, the LED light strip is contained within a lighting channel that does not also support the glass panes, accordingly, light from the light strip can be simultaneously directed toward the edges of several panels of glass.

Accordingly, the present disclosure describes walkable skylight lighting system, installed to a roofing structure, including a skylight having a pane and framing members that surround and support the pane, and including a paving surface, the paving surface having a plurality of pavers that extend immediately adjacent to the skylight. The pane is an insulating glass unit (IGU) having structural glass panels and a thermal panel that are separated and sealed by a spacer, and that are separately supported so that they do not crush the spacer. The framing members include an upper framing member that has a lighting channel containing an LED lighting strip that edge lights the structural glass panels in the pane.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
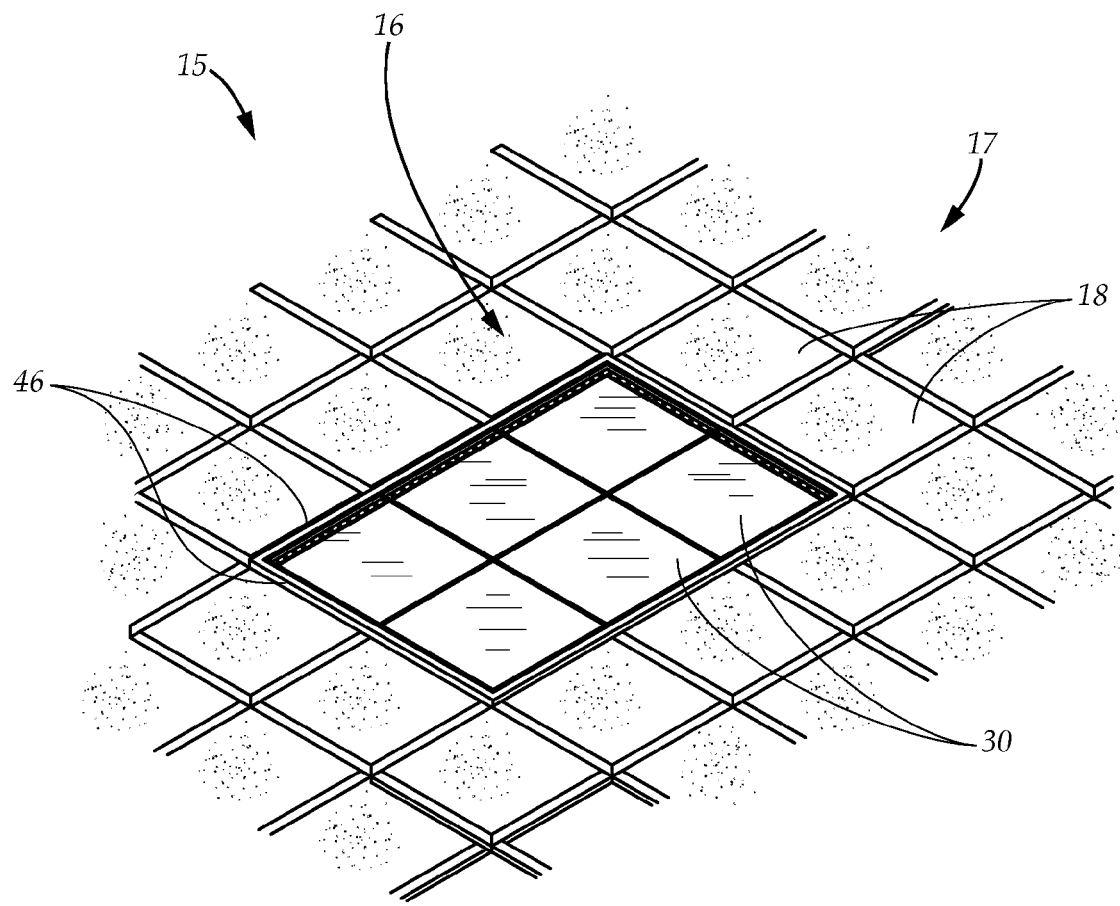
FIG. 1 is diagrammatic perspective view, illustrating an embodiment of a pedestal paver and skylight walkway, with an edge lighting assembly within the skylight.
Figure 5:
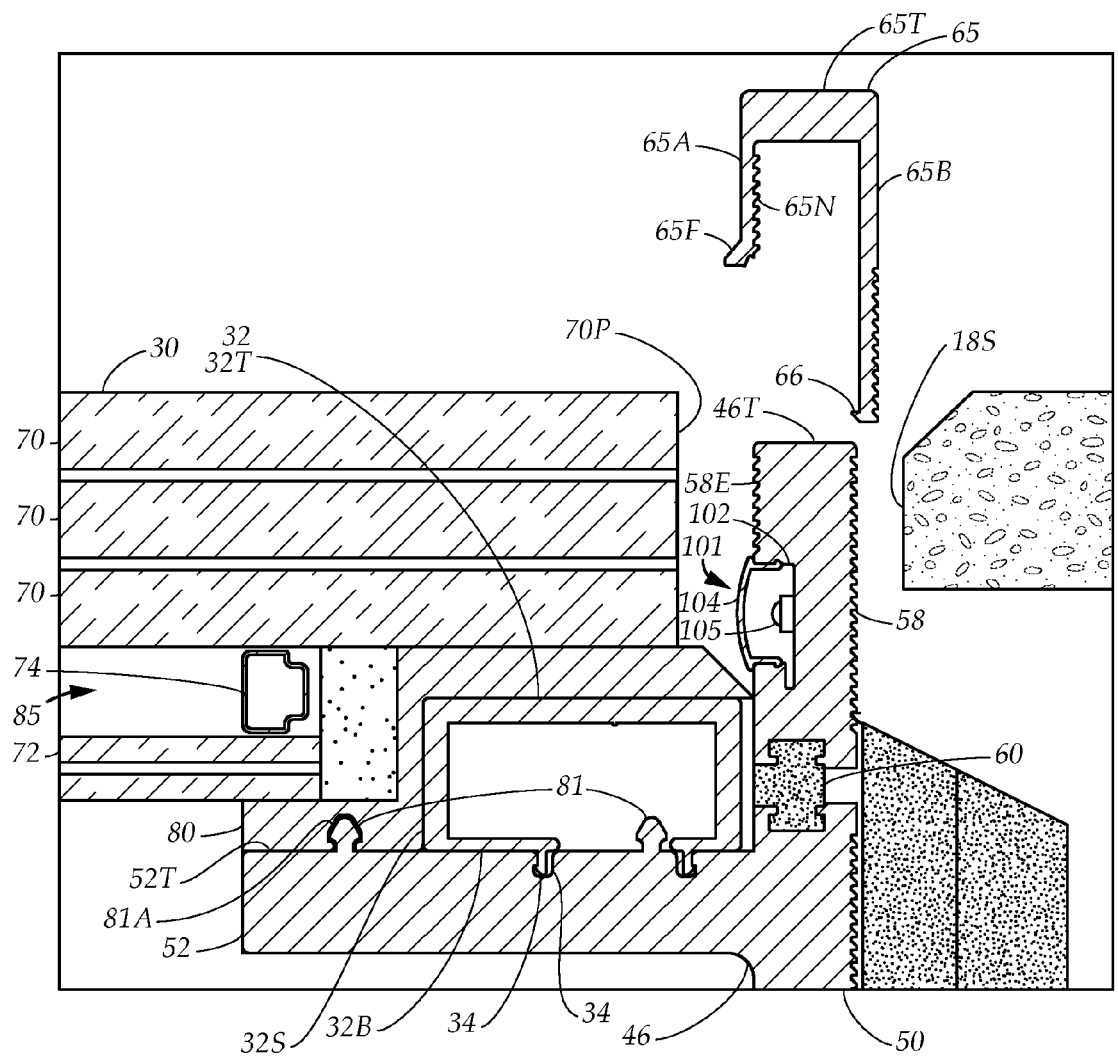
FIG. 5 is a cross sectional view, showing further details of the skylight framing, wherein the adjustable cap has been separated from the upper vertical portion.
Figure 6:
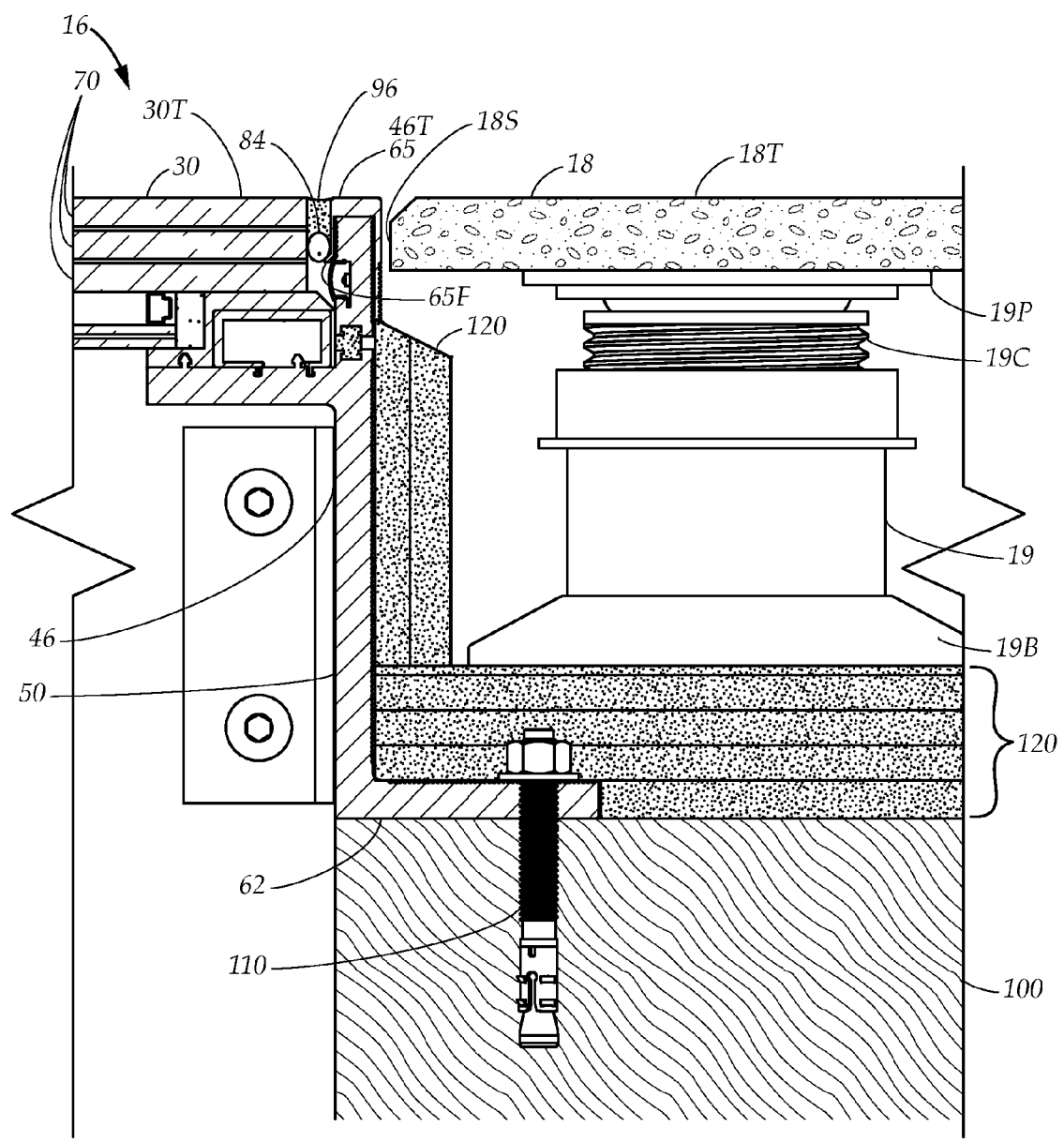
FIG. 6 is a cross sectional view, illustrating integration of the skylight, pavers, roof structure, and waterproofing materials to provide the continuous walkway.

FIG. 1 illustrates an illuminated skylight and paver walkway 15. The walkway 15 includes a skylight 16, having framing members 46 that support glass panes 30, and having a paving surface 17 that includes a plurality of pavers 18. The pavers 18, framing members 46, and panes 30 are substantially flush, so that the walkway 15 is continuous. Referring to FIG. 6, the skylight 16 is mounted within a roofing structure 100. Pedestals 19 support the individual pavers 18 and are adjustable in height to keep the pavers 18 level, despite a likely drainage slope in the roofing structure 100, sloping away from the skylight 16. One of the framing members 46 of the skylight 16 is secured to the roofing structure 100 with an anchoring fastener 110. In particular, the framing member has a vertical portion 50 and a connecting flange 62. The anchoring fastener 110 extends through the connecting flange 62. As seen in FIG. 5, the framing member 46 has an upper vertical part 58 that is connected to the vertical portion 50 with a thermal break 60, and an adjustable cap 65 with an adjustable cap top 65T that fits onto the upper vertical part 58. The framing member 46 has a framing member top 46T. Once the adjustable cap 65 is fully installed, the framing member top 46T may be considered the same as the adjustable cap top 65T. The framing member 46 also has a support shelf 52 that extends laterally from the vertical portion 50 and supports the pane 30.

The upper vertical part 58 that extends above the upper support shelf 52 is coextensive with the vertical portion 50. The thermal break 60 that connects the upper vertical part 58 and vertical portion 50 is made of an insulative material that connects and yet fully isolates the upper vertical part 58 from the vertical portion 50. The insulative material is preferably a resin that is inserted or injected as part of the extrusion process for fabricating the framing member 46.

The framing member itself, including the vertical portion 50, the upper vertical part 58, and support shelf 52 is preferably made of a suitable structural material, a strong metal such as aluminum. The thermal break 60 is keyed, having a shape which includes portions that effectively lock within the upper vertical part 58 and vertical portion 50, to create a solid coextensive piece of material that comprises the framing member 46 once the resin hardens.

The pane 30 has a pane top 30T. Referring to FIG. 6, each paver 18 has a paver top 18T. In accordance with the principles of the present disclosure, the paver top 18T of at least the paver 18 adjacent to the framing member 52 is level and thus flush with the pane top 30T and the framing member top 46T, and thus is flush with the adjustable cap top 65T of the adjustable cap 65 between said pane 30 and said framing member 46.

The pedestals 19 are supported on the roofing structure 100 upon waterproofing and insulation material 120 that extends along the roofing structure 100 and continues up along the framing member 46 to the adjustable cap 65. Each pedestal 19 has a base 19B, a platform 19P, and an adjustment mechanism 19C that adjusts relative distance between the base 19B and platform 19P and thereby provides height adjustment for the paver 18 supported by the platform 19P.

Referring now to FIG. 5, details of the pane 30 are provided. Each pane includes several parallel panels of glass. In particular, the pane 30 is an insulating glass unit that includes structural glass panels 70, a thermal panel 72, and a spacer 74 that seals to the thermal panel 72 and structural glass panel 70 immediately thereabove and creates and seals an air gap 85 therebetween. The structural glass panels 70 have significant weight, often several hundred pounds each. The weight of the structural glass panels 70 could easily crush the spacer 74. To prevent the spacer 74 from crushing under the weight of the structural glass panels 70, separate support is provided for the structural glass panels 70 and thermal glass panel 72. In particular, a step block 32, having a bottom 32B and step block top 32T, rests upon the support shelf 52 and directly supports the heavy structural glass panels 70, while the thermal panel 72 and spacer 74 are supported more directly by the support shelf 52. The step block 32 has a step block height, and has a step block inner side 32S which creates its height. To properly support the structural panels 70 such that they do not exert their weight upon the spacer 74, the step block height is substantially the same as a thickness of the thermal panel 72 and vertical height of the spacer 74 combined. The step block 32 is made of metal, such as extruded aluminum, and may be configured to be detachable, wherein the step block bottom 32B and support shelf top 52T having mating fasteners 34 that allow the block 32 to selectively snap onto the support shelf 52.

The structural glass panels 70 and the thermal panel 72 rest upon a glass setting block 80. The glass setting block 80 is made of a rubbery, or rubber-like material, and acts as a gasket—cushioning the glass panels 70, 72 and sealing with the support shelf 52. The step block 32 creates a contour between the step block top 32T, the step block inner side 32S, and the support shelf 52. The glass setting block 80 follows this contour and extends between the structural glass panels 70 and step block top 32T, and between the thermal panel 72 and the support shelf 52. Optionally, the glass setting block 80 may also continue upwardly, along the upper vertical part 58. Preferably mating protrusions 81 and openings 81A on the framing member 46 and glass setting block 80 respectively, help maintain the glass setting block 80 in position. Note that one of the protrusions 81A shown is not illustrated as being in use when the step block 32 is present. Both protrusions would be used when mating with a relatively flat glass setting block 80. A flat glass setting block 80 may be used when in place of the step block 32, a strong, load-bearing spacer is used to support the structural glass. Such load-bearing spacer has a solid, slab-like part that supports the weight of the structural glass, and an attached tube part similar to spacer 74, with the same thickness as the slab part, that contains desiccant to remove moisture from the air gap 85.

Figure 4:
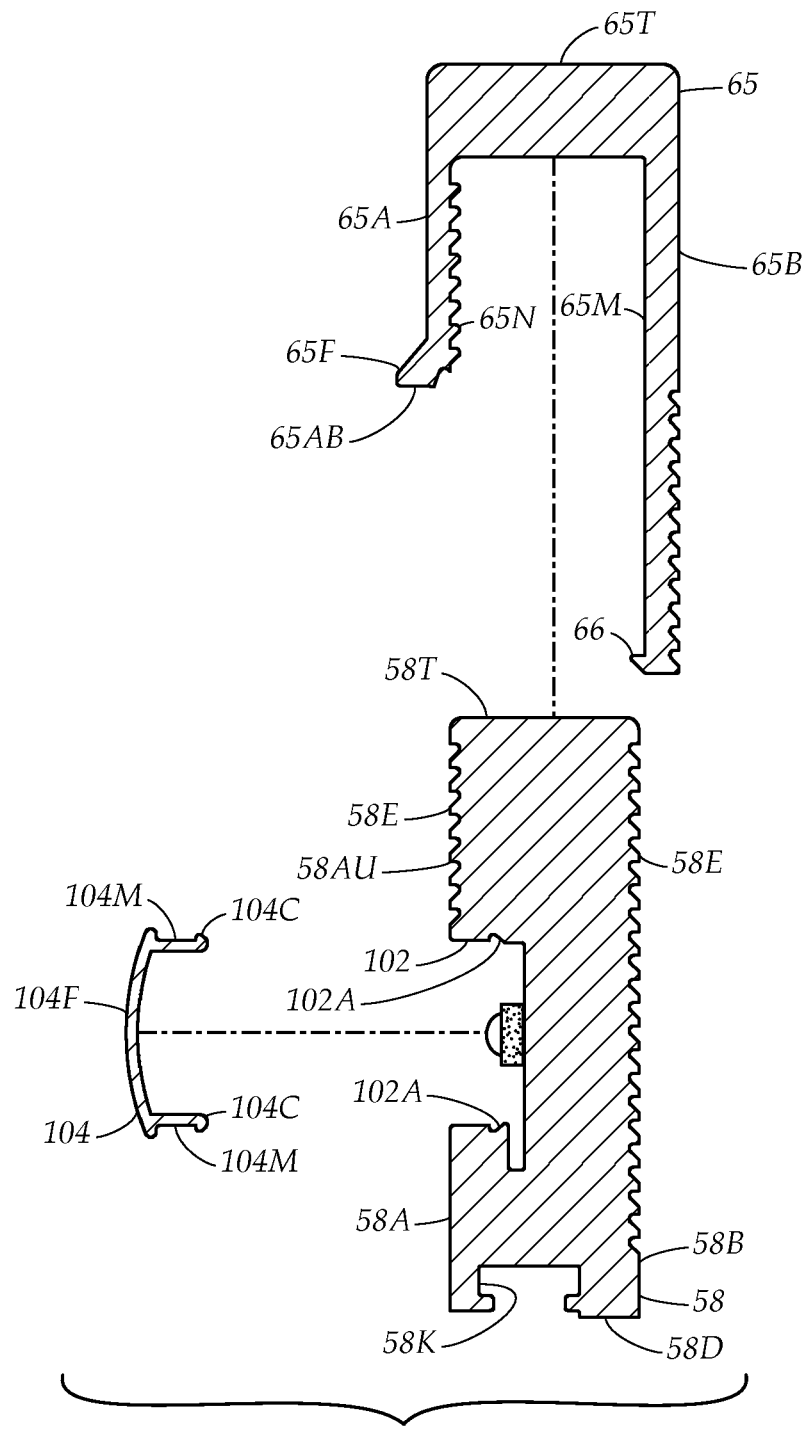
FIG. 4 is a cross sectional view of the upper vertical part and adjustable cap, showing a lighting lens being mated to the lighting channel.

Referring now to FIG. 4, in order for the framing member to be height adjustable, the upper vertical part 58 has notched vertical surfaces 58E. In particular, the upper vertical part has an interior wall 58A and an exterior wall 58B, both having the notched vertical surfaces 58E extending longitudinally theralong. The upper vertical part 58 has an upper vertical part bottom 58D and an upper vertical part top 58T. The upper vertical part top 58T defines a width of the upper vertical part 58, since the interior wall 58A and exterior wall 58B are substantially parallel. The adjustable cap 65 has an inside wall 65A and an outside wall 65B. The adjustable cap top 65T extends between the inside wall 65A and outside wall 65B. The adjustable cap top 65T, the inside wall 65A, and the outside wall 65B together define a substantially u-shaped main channel 65M that is substantially the width of the upper vertical part 58. When the upper vertical part 58 extends into the main channel 65M as suggested in FIG. 4, the inside wall 65A of the adjustable cap 65 extends alongside and against the interior wall 58A of the upper vertical part 58, and the outside wall 65B extends alongside and against the exterior wall 65B of the adjustable cap 65. The outside wall 65B has an inwardly extending lower hook 66, protruding into the main channel 65M for engaging the notched vertical edges 58E on the exterior wall 58B of the upper vertical part 58 and maintaining the adjustable cap 65 in position on the upper vertical part 58. The inside wall 65A may have internal notches 65N for engaging the notched vertical edges 58E on the interior wall 58A of the upper vertical part 58. The inside wall 65A also has a protruding foot 65F which extends downwardly and away from the inside wall 65A, toward the pane 30. Referring momentarily to FIG. 6, the protruding foot 65F provides support for backer rod 84, generally made of foam or the like, that is extended in the space between the adjustable cap 65 and pane 30. A sealant 96, such as clear structural silicone, is filled in above the backer rod, between the adjustable cap 65 and structural glass panels 70 that form part of the pane 30. Referring again to FIG. 4, the upper vertical part cap 65 is adapted to extend over the upper vertical part 58 and is pushed downwardly thereupon until the adjustable cap top 65T is at its desired height.

Referring to FIG. 5, the upper vertical part 58 of the framing member 46 may also have an edge lighting assembly 101 for providing edgewise illumination of the glass, that may include a lighting channel 102, a translucent lighting lens 104 that selectively covers and extends into the lighting channel 102, and a lighting element, namely an LED lighting strip 105, extending within the lighting channel 102. The structural glass panels 70 each have a perimeter edge 70P. The lighting channel 102, the lens 104 and the lighting strip 105 are all directed toward the edges 70P of the structural glass panels 70P. Note that since the structural glass panels 70 are not supported along their perimeter edges 70P, light can be directed at several of the panels 70P at once, with consideration made for the appropriate selection and placement of the backer rod 84 and sealant 96 (seen in FIG. 6) to maximize light reaching the perimeter edges 70P of at least the two lowermost of the structural glass panels 70. Note that back paint may be provided between two uppermost of the structural glass panels, creating a border region near the framing member and extending inwardly to just above the spacer 74, to hide the glass setting block 80 and spacer 74 from view by a person walking upon the skylight 16.

Referring again to FIG. 4, The lighting channel 102 extends into the interior wall 58A of the upper vertical part 58. The lens 104 selectively snaps into the lighting channel 102. Note that the inside wall 65A of the adjustable cap 65 is shorter in height than the outside wall 65B, to prevent the inside wall 65A from covering the lighting channel 102. In particular, the inside wall 65A has an inside wall bottom edge 65AB and has an inside wall height that is defined between the inside wall bottom edge 65AB and immediately under the adjustable cap top 65T. The interior wall 58A includes an upper interior wall 58AU that extends from the lighting channel 102 to the upper vertical part top 58T, having an upper interior wall height therebetween. The inside wall height is not greater than the upper interior wall height, so that even when the upper vertical part 58 is fully inserted into the adjustable cap 65, the inside wall 65A will not cover the lighting channel 102. The outside wall 65B, however, can be significantly longer (or greater in height), with its lower hook 66 extending well below the lighting channel 102 when the upper vertical part 58 is fully inserted into the adjustable cap 65. The upper vertical part 58 has a thermal break opening 58K extending upwardly from the upper vertical part bottom 58D, which is filled with resin to create the thermal break 60 that connects the upper vertical part 58 with the vertical portion 50 (see FIG. 5).

Figure 2:
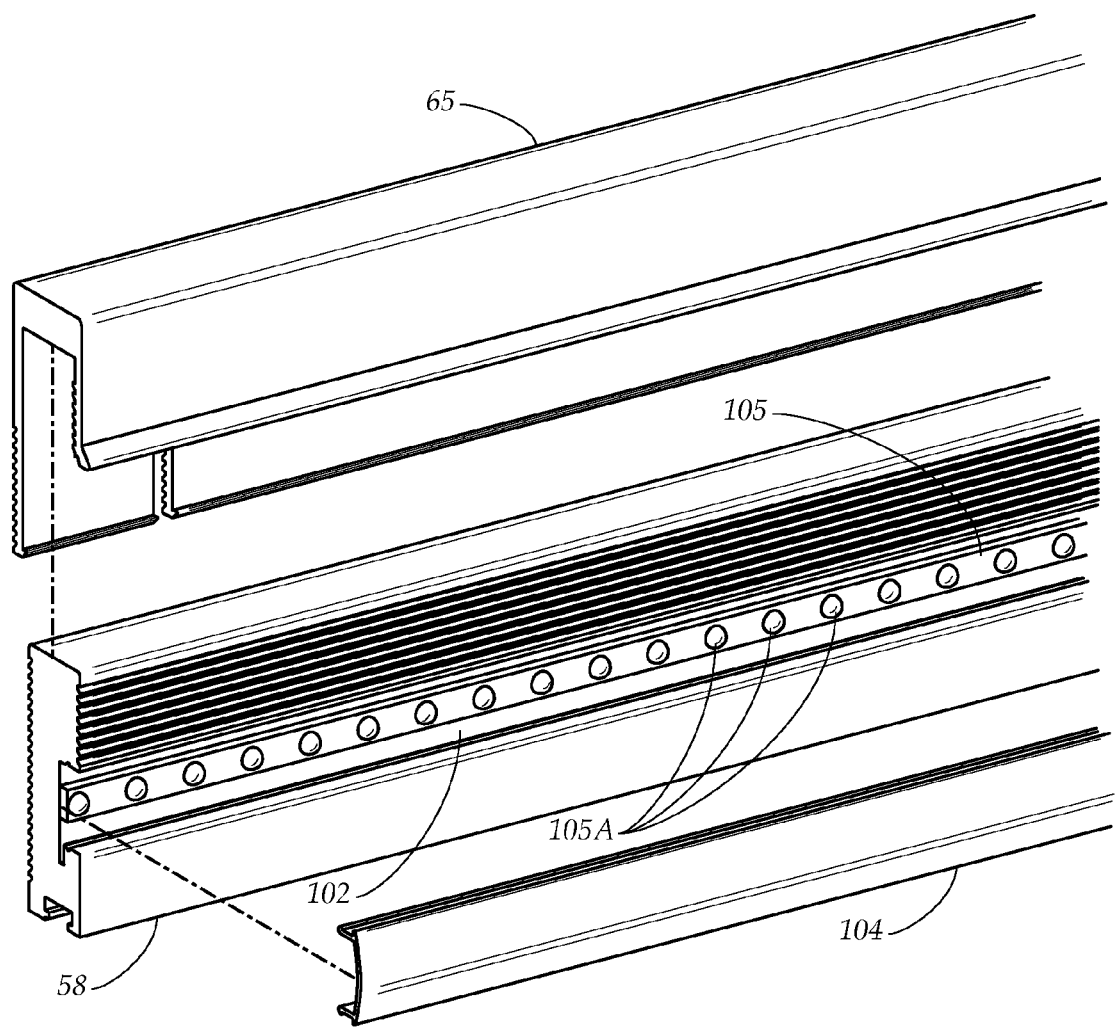
FIG. 2 is a diagrammatic perspective view, showing an upper vertical part of a framing member of the skylight, showing the LED lighting strip within a lighting channel of the upper vertical part, and an adjustable cap being mated thereto.

Still referring to FIG. 4, the lighting channel 102 has an upper and lower indent 102A. The lens 104 has a curved front 104F, and parallel upper and lower members 104M. The upper and lower members 104M each have a catch 104C. Referring to FIGS. 2 and 4, The lens 104 is mated to the lighting channel 102 by pressing the upper and lower members 104M into the channel 102 until the catches 104C click into the indents 102A.

Figure 3:
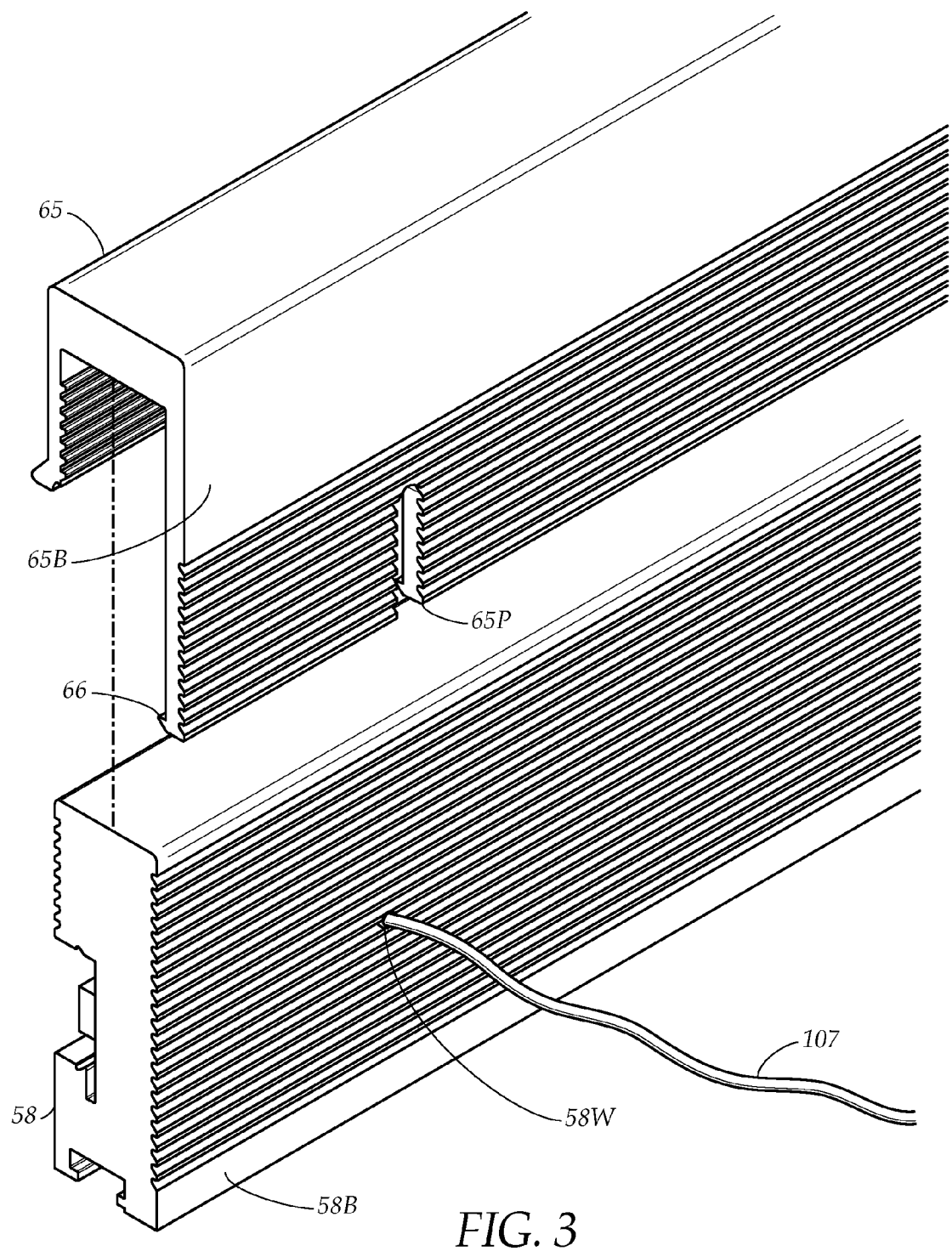
FIG. 3 is a diagrammatic perspective view showing the upper vertical part detached from the framing member, with provisions in the upper vertical part and adjustable cap for a power cable of the edge lighting assembly.

Illustrated in FIG. 2, the lighting strip 105 includes numerous individual lighting elements 105A, namely LEDs. The lighting elements 105A preferably include different colors, such as red, green, and blue, (RGB) which are separately controllable in intensity to allow essentially any color or pure white light to be created. Power is supplied to the lighting strip 105 through a power cable 107 seen in FIG. 3. Referring to FIG. 3, a power cable opening 58W may be provided through the exterior wall 58B of the upper vertical part 58, extending to the lighting channel 102. The power cable opening 58W is provided at a suitable longitudinal location along the extruded upper vertical part 58. Note that the adjustable cap 65, preferably has a power cable notch 65P, which extends vertically on the outside wall 65B upwardly from the lower hook 66 at a longitudinal location along the adjustable cap 65 that corresponds to the power opening 58W.

With reference to FIGS. 5 and 6, note that since the pane 30 typically has four sides, it may be supported on all four sides by apparatus described hereinabove, including the framing members 46, as well as the support shelf 52, step block 32, and glass setting block 80 provided for each framing member 46, such that four of each said items are arranged in a rectangular configuration to support the pane 30. Note, however, that in some installations having multiples panes 30, as seen in FIG. 1, each framing member has more of a rafter configuration where it does not have an upper vertical part 58, and the step block 32 may be wider, as each framing member 46 and each step block 32 are configured to support the structural glass panels from two adjacent panes, Similarly, in a single pane skylight, the pane 30 may be surrounded by four adjustable caps 65 that create a boundary for the pane 30 that is flush therewith, as described above. When multiple panes are present, only the panes 30 adjacent to the pavers 18 will have the adjustable cap 65, and edge lighting assembly 101. Panes 30 that adjoin other panes 30, however, will be flush with each other, with a small gap therebetween that is generally filled with silicone sealant. Generally clear sealant would be used to allow lighting effects to impact adjacent panes 30.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented an illuminated paver and skylight walkway, configured to provide a continuous walking surface. The disclosure is illustrated by example in the drawing figures and throughout the written description. It should be understood that numerous variations are possible while adhering to the inventive concept. Such variations are contemplated as being a part of the present disclosure.

What is claimed is:

1. A walkable skylight lighting system, installed on a roofing surface, comprising:
    a skylight, having framing members that are secured to the roofing surface and support a glass pane, wherein the pane is an insulating glass unit that includes a structural glass panel having significant weight and having a perimeter edge, a thermal glass panel, and a spacer between the structural glass panel and thermal glass panel creating an air gap therebetween, wherein the structural glass panel and thermal panel are separately supported such that the structural glass panel does not exert its weight upon the spacer and thermal glass panel;
    wherein each framing member has a vertical portion and an upper vertical part, the upper vertical part extending upwardly near the perimeter edge of the structural glass panel but not supporting the structural glass panel, the upper vertical part having an interior wall and having a lighting channel extending into the interior wall; and
    an LED lighting strip, extending within the lighting channel, for directing light toward the perimeter edge of the structural glass panel.

2. The walkable skylight lighting system as recited in claim 1, wherein each framing member has a thermal break that connects the vertical portion and upper vertical part, each framing member further having a support shelf extending laterally from the vertical portion, the support shelf having a support shelf top, each framing member further having a step block that is attached to the support shelf top and has a step block top, wherein the support shelf top supports the thermal glass panel and the step block top supports the structural glass panel.

3. The walkable skylight lighting system as recited in claim 2, wherein the upper vertical part has an exterior wall opposite from the interior wall, the framing member further comprising an adjustable cap having an adjustable cap top, an inside wall and an outside wall, the adjustable cap having a main channel between the inside wall, the outside wall, and the adjustable cap top, the upper vertical part extending into the main channel with the interior wall against the inside wall and the exterior wall against the outside wall.

4. The walkable skylight lighting system as recited in claim 3, wherein the inside wall of the adjustable cap has an inside wall bottom edge and has an inside wall height that is defined between the inside wall bottom edge and the adjustable cap top; wherein the interior wall or the upper vertical part includes an upper interior wall that extends from the lighting channel to the upper vertical part top, the upper interior wall having an upper interior wall height; and wherein the inside wall height is not greater than the upper interior wall height, so that when the upper vertical part is fully inserted into the adjustable cap the inside wall does not block the lighting channel.

5. The walkable skylight lighting system as recited in claim 4, wherein the lighting channel has an upper and lower indent; further comprising a lens having a curved front, parallel upper and lower members, the parallel upper and lower members each having a catch; wherein the lens is mated to the lighting channel by pressing the upper and lower members into the channel until the catches click into the indents.

6. The walkable skylight lighting system as recited in claim 5, wherein the inside wall has a protruding foot extending from the inside wall bottom edge, the protruding foot adapted for supporting backer rod extending between the adjustable cap and the perimeter edge of the structural glass panel.

7. The walkable skylight lighting system as recited in claim 6, wherein the upper vertical part has notched edges extending longitudinally along the exterior wall; and wherein the adjustable cap has a lower hook for engaging the notched edges and maintaining the adjustable cap on the upper vertical part.

8. The walkable skylight lighting system as recited in claim 7, further comprising a power cable for supplying power to the LED lighting strip; wherein the upper vertical part has a power cable opening through the exterior wall and extending to the lighting channel; and wherein the adjustable cap has a power cable notch extending vertically on the outside wall, upwardly from the lower hook, the power cable opening and power cable notch longitudinally aligned on the upper vertical part and adjustable cap, the power cable extending through the power cable opening and power cable notch.

9. The walkable skylight lighting system as recited in claim 8, further comprising a glass setting block associated with each framing member, each glass setting block made of a rubbery material and extending upon the support shelf for directly supporting the thermal pane, extending upwardly along the step block inner side, and extending across the step block top to directly support the structural glass panel.

10. An illuminated paver and skylight walkway, installed upon a roofing surface, comprising:
  a skylight, having framing members that support a glass pane, the pane having a pane top, the framing members each having an adjustable cap that is height adjustable, each adjustable cap having an adjustable cap top, the framing members having an upper vertical part that extends upwardly along the pane but does not support the pane, the upper vertical part has a lighting channel that extends alongside the pane and an LED lighting strip inside of the lighting channel that edge lights the pane;
  a paving surface having a plurality of pavers supported by and raised above the roofing structure, each paver having a paver top, the paving surface extending immediately adjacent to the skylight; and
  wherein the paver top of each paver that is immediately adjacent to one of the framing members is flush with the adjustable cap top of the adjustable cap of said framing member and flush with the glass pane such that a continuous walking surface is created with the skylight and paving surface.

11. The illuminated paver and skylight walkway as recited in claim 10, wherein the lighting channel has an upper and lower indent; further comprising a lens having a curved front, parallel upper and lower members, the parallel upper and lower members each having a catch; wherein the lens is mated to the lighting channel by pressing the upper and lower members into the channel until the catches click into the indents.

12. The illuminated paver and skylight walkway as recited in claim 11, wherein the pane is an insulating glass unit that includes a structural glass panel having significant weight and having a perimeter edge, a thermal glass panel, and a spacer between the structural glass panel and thermal glass panel creating an air gap therebetween, the lighting channel adjacent to and directing light toward the perimeter edge of the structural glass panel.

13. The illuminated paver and skylight walkway as recited in claim 12, wherein each framing member includes a support shelf that has a support shelf top and extends laterally from the vertical portion, and a step block on the support shelf top, the step block having a step block top, a step block bottom, and a step block inner side, wherein the structural glass panel is supported by the step block and the thermal glass panel is supported by the support shelf, such that the structural glass panel does not exert its-weight upon the spacer between the structural glass panel and thermal glass panel.

14. The illuminated paver and skylight walkway as recited in claim 13, further comprising a pedestal associated with each paver, each pedestal having a base, a platform, and an adjustment mechanism, each pedestal supporting its associated paver on its platform.

15. The illuminated paver and skylight walkway as recited in claim 14, wherein the upper vertical part has an exterior wall opposite from the interior wall, the adjustable cap has an inside wall and an outside wall, the adjustable cap having a main channel defined by the inside wall, the outside wall, and the adjustable cap top, the upper vertical part extending into the main channel with the interior wall against the inside wall and the exterior wall against the outside wall.

16. The illuminated paver and skylight walkway as recited in claim 15, wherein the inside wall of the adjustable cap has an inside wall bottom edge and has an inside wall height that is defined between the inside wall bottom edge and the adjustable cap top; wherein the interior wall or the upper vertical part includes an upper interior wall that extends from the lighting channel to the upper vertical part top, the upper interior wall having an upper interior wall height; and wherein the inside wall height is not greater than the upper interior wall height, so that when the upper vertical part is fully inserted into the adjustable cap the inside wall does not block the lighting channel.

17. The illuminated paver and skylight walkway as recited in claim 16, further comprising a glass setting block associated with each framing member, each glass setting block made of a rubbery material and extending upon the support shelf for directly supporting the thermal pane, extending upwardly along the step block inner side, and extending across the step block top to directly support the structural glass panel.

18. The illuminated paver and skylight walkway as recited in claim 17, wherein the support shelf top and step block bottom have mating fasteners such that the step block is selectively detachable from the support shelf.

19. The illuminated paver and skylight walkway as recited in claim 18, wherein the inside wall of the adjustable cap has a protruding foot that extends between the framing member and the pane, wherein the paver and skylight walkway further comprises backer rod extending between the pane and framing members, and wherein the protruding foot helps maintain the backer rod in place.

* * * * *